United States Patent [19]

Moldenhauer

[11] Patent Number: 4,688,628
[45] Date of Patent: Aug. 25, 1987

[54] STEAM GENERATOR SUPPORT SYSTEM

[75] Inventor: James E. Moldenhauer, Simi Valley, Calif.

[73] Assignee: Rockwell International Corporation, El Segundo, Calif.

[21] Appl. No.: 805,686

[22] Filed: Dec. 6, 1985

[51] Int. Cl.⁴ .............................................. F28F 9/00
[52] U.S. Cl. ...................................... 165/67; 122/510; 376/285; 376/402
[58] Field of Search ............... 376/179, 402, 461, 370, 376/391, 285; 122/510; 165/67, 68; 248/DIG. 1

[56] References Cited

U.S. PATENT DOCUMENTS

| | | | |
|---|---|---|---|
| 3,771,499 | 11/1973 | Marroni, Jr. et al. | 376/461 |
| 4,115,194 | 9/1978 | Butti | 376/285 |
| 4,246,872 | 1/1981 | Skinner et al. | 165/67 |
| 4,335,467 | 6/1982 | Robin | 376/285 |
| 4,485,994 | 12/1984 | Anglaret et al. | 248/DIG. 1 |
| 4,517,927 | 5/1985 | Gillett et al. | 122/510 |

Primary Examiner—Deborah L. Kyle
Assistant Examiner—Richard L. Klein
Attorney, Agent, or Firm—H. Fredrick Hamann; Harry B. Field; Clark E. DeLarvin

[57] ABSTRACT

A support system for connection to an outer surface of a J-shaped steam generator for use with a nuclear reactor or other liquid metal cooled power source. The J-shaped steam generator is mounted with the bent portion at the bottom. An arrangement of elongated rod members provides both horizontal and vertical support for the steam generator. The rod members are interconnected to the steam generator assembly and a support structure in a manner which provides for thermal distortion of the steam generator without the transfer of bending moments to the support structure and in a like manner substantially minimizes forces being transferred between the support structure and the steam generator as a result of seismic disturbances.

4 Claims, 4 Drawing Figures

STEAM GENERATOR SUPPORT SYSTEM

STATEMENT OF GOVERNMENT INTEREST

The Government has rights in this invention pursuant to Contract (or Grant) No. DE-AC06-85NE-37936 awarded by the U.S. Department of Energy.

BACKGROUND OF THE INVENTION

1. Field of the Invention

Broadly, the subject invention relates to a support system for a heat exchange device such as a steam generator. More particularly, it relates to a support system for a J-shaped steam generator for use with a liquid metal-cooled nuclear reactor.

2. Description of the Prior Art

The steam generators used to transfer energy from a liquid coolant (typically liquid sodium or a liquid sodium-potassium mixture) to water are key components for the successful operation of a liquid metal fast breeder reactor (LMFBR) power plant or other liquid metal cooled power source. There are three major designs of steam generators which represent the state-of-the-art of current U.S. technology. These major designs are the helical steam generator, the duplex tube with expandable shell and the J-shaped steam generator, by which latter term is meant a steam generator having a curved or bent section at one end, typically at the top.

A prototype J-shaped steam generator has been designed for use in an LMFBR. A number of problems with the prototype design have been identified as a result of testing and further analysis. Accordingly, it is desired to provide design alterations to the manner in which the prototype J-shaped steam generator is mounted to improve its safety and performance.

SUMMARY OF THE INVENTION

The present invention provides a support system for the interconnection of an outer surface of a J-shaped steam generator for use with a nuclear reactor to a support structure. In contrast to prior methods of installation, in accordance with the present invention the J-shaped steam generator is mounted with the bend (usually about 90°) at the bottom. The support system provides support for the steam generator in a vertical Y axis and horizontal X and Z axes; each of said axes being perpendicular to the others.

The system includes a vertical support means, located intermediate a lower portion of said J-shaped steam generator and said support structure, for providing vertical support along said Y axis and providing pivotal motion about one of said X or Z axes to prevent bending moments from being transmitted from said steam generator through said support.

A first pair of horizontal support means are provided, one located intermediate a lower portion of said steam generator and said support structure and the other intermediate an upper portion of said steam generator and said support structure for providing lateral support in a selected one of said X or Z axes, each of said support means permit limited vertical movement of said steam generator along said Y axis and resist any movement along the selected horizontal axis. One of said pair of support means also permits limited rotational movement of said steam generator about said Y axis and the other of said support means resists such rotational movement whereby the transfer of bending moments through said first pair of support means as a result of any rotational movement of said steam generator is substantially minimized. Torsional loads on the steam generator as a possible result of differential movement or rotation of the surrounding support structure during a seismic event are also minimized.

A second pair of horizontal support means is provided for horizontal support in the other of said X or Z axes. One of said second pair of support means is located intermediate an upper portion of said steam generator and said support structure and the other is located intermediate a lower portion of said steam generator and said support structure. Each of said support means permits some vertical movement of said steam generator along said Y axis and resists any horizontal movement of said steam generator.

OBJECT OF THE INVENTION

It is an object of the invention to provide an improved means of supporting a J-shaped steam generator within a support structure.

It is another object of the invention to provide a support means for a J-shaped steam generator which will minimize the bending moments transmitted through the support system to the support structure.

It is another object of the invention to provide a support system for a J-shaped steam generator which will accommodate thermal distortion of the steam generator.

Still another object of the invention is to provide such a support system which will minimize the transmission of bending force or moments from the support structure to the steam generator in the event of a siesmic disturbance.

Still another object of the invention is to provide a support system for a J-shaped steam generator which will accommodate a substantial increase in the length of the steam generator resulting from thermal expansion.

These and other objects of the invention will be more apparent from the drawings and the following description thereof.

DETAILED DESCRIPTION OF THE INVENTION

Figure 1:
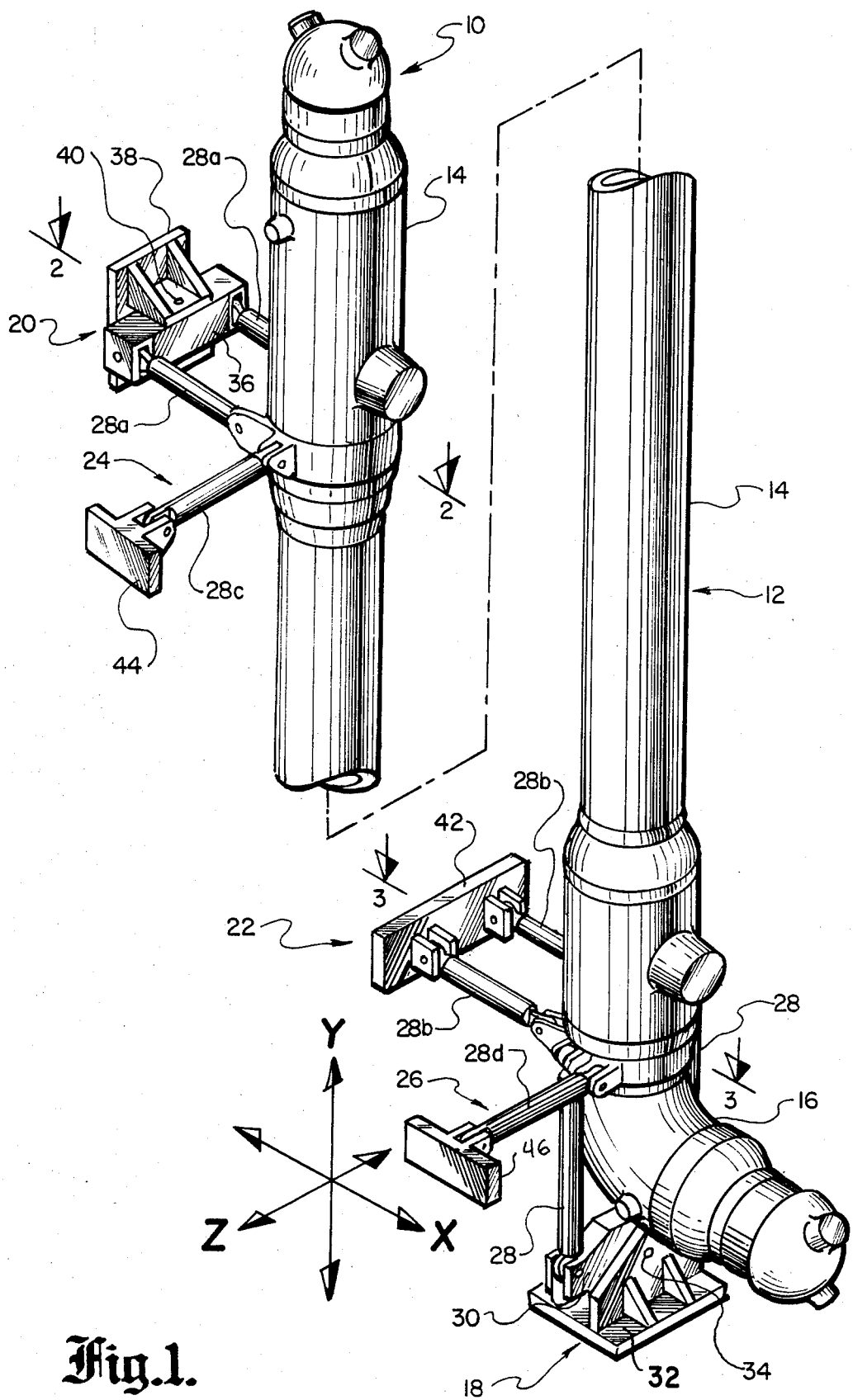
FIG. 1 is an isometric view of a J-shaped steam generator mounted in accordance with the present invention.

Referring to FIG. 1 therein is shown a support system 10 for supporting a J-shaped steam generator within a surrounding support structure in accordance with the present invention. Typically the surrounding support structure will be a building in which the steam generator is located or a surrounding steel frame work which may or may not be located within a building. For clarity the support structure is not shown. As depicted, it will be seen that the J-shaped steam generator 12 has a substantially symmetrical vertically extending upper portion 14 and terminates at its lower end in a bent portion 16. For convenience, the invention will be decribed with reference to X, Y and Z axes as depicted on FIG.

1; namely, Y is a vertical axis, X is an axis extending in the same direction as bent portion 16 and Z is an axis transverse to the X axis.

For purpose of illustration, steam generator 12 is depicted as having a lower portion 16 bent at an angle of 90°. The purpose of the bend is to allow for thermal expansion of the heat exchange tubes contained therein. Obviously the angle could be greater or less than 90°. Indeed in some instances portion 16 may be bent as much as 180°.

It will be seen that the support system of the present invention comprises five separate support assemblies. Located directly underneath steam generator assembly 12 is a lower support assembly 18 which provides vertical support along said Y axis. More specifically, lower support assembly 18 supports substantially the entire weight of steam generator assembly 12.

Located adjacent an upper portion and lower portion of steam generator assembly 12 are horizontal support assemblies 20 and 22 respectively which provide substantially the entire support in the X direction. In a substantially similar manner, the entire horizontal support in the Z direction is provided by upper and lower horizontal support assemblies 24 and 26 respectively. From FIG. 1 it will be seen that each of the support members includes at least one elongated bar member terminating at each end in a clevis connection (which will be described in more detail later with reference to FIG. 4). One of the clevis connections attaches to steam generator assembly 12 and the other is attached directly to or interconnected to the support structure.

Figure 2:
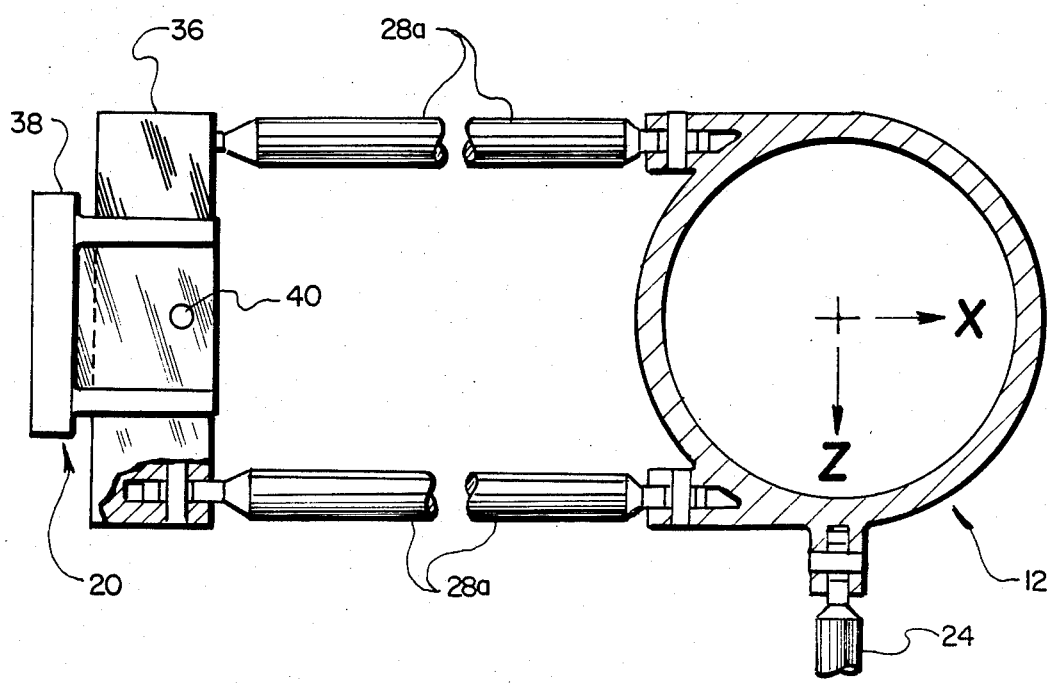
FIG. 2 is a cross-sectional view taking along cutting plain 2—2.
Figure 3:
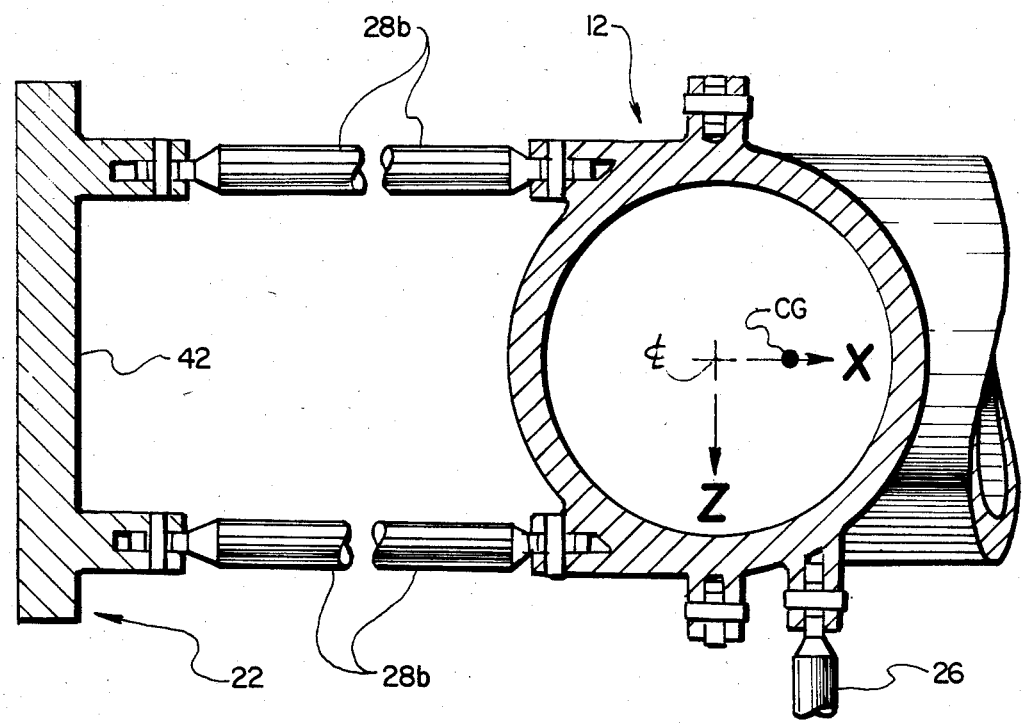
FIG. 3 is a cross-sectional view taken along cutting plain 3—3.

The individual support assemblies will now be described in more detail with reference to FIGS. 1-3. As depicted, lower support assembly 18 comprises two upwardly extending elongated rod members 28, each of which terminate at its upper end in a clevis connection which is attached to steam generator assembly 12 and at its lower end with another clevis connection which is attached to a balance beam 30. Balance beam 30 is in turn connected to a bearing plate 32 by a pivot pin 34. The purpose of having balance beam 30 pivotally mounted to bearing plate 32 is to minimize the transfer of bending moments between the support structure and steam generator assembly 12, which bending moments could result from either thermal distortion of the steam generator or from the steam generator and the support structure being subjected to a seismic disturbance.

In a similar manner, upper horizontal support assembly 20 also includes a pair of elongated rod members $28_a$ each of which terminate at each end in a clevis connection. The clevis connections at one end of rod members $28_a$ are connected to opposite sides of steam generator assembly 12. The clevis connections at the opposite end of rod members $28_a$ are connected to an integral part of a balance beam 36. Balance beam 36 is pivotally connected to a bearing plate 38 by a pivot pin 40. Bearing plate 38 is, of course, rigidly secured directly or indirectly to an inner surface of the support structure. Horizontal support in the X direction also is supplied by lower horizontal support assembly 22. Support 22 also includes a pair of elongated rod members $28_b$, each end of which terminates in a clevis connection. One end is affixed to steam generator assembly 12 and the other to a bearing plate 42. Bearing plate 42 also is connected directly or indirectly to an inner surface of the support structure.

Transverse support (support in the Z direction) is provided by upper and lower horizontal support assemblies 24 and 26 respectively. Each of these support assemblies comprises elongated rod members $28_c$ and $28_d$, each of which are connected via a clevis connection to steam generator assembly 12 at one end and at the other end, via another clevis connection to bearing plates 44 and 46 respectively. Each of bearing plates 44 and 46 also are connected directly or indirectly to an inner surface of the support structure. Referring to FIG. 3 in particular it will be seen that lower support assembly 26 is offset from the centerline ($\ell$) of steam generator assembly 12. It will be appreciated that as a result of the lower bent portion 16 of steam generator assembly 12 that its center of gravity (CG) will be offset from the center line in the X direction. Thus, in accordance with the preferred embodiment depicted, lower support assemby 26 is offset in the same direction such that any force acting on the CG in the Z direction will be coplanar with support assemblies 24 and 26.

Figure 4:
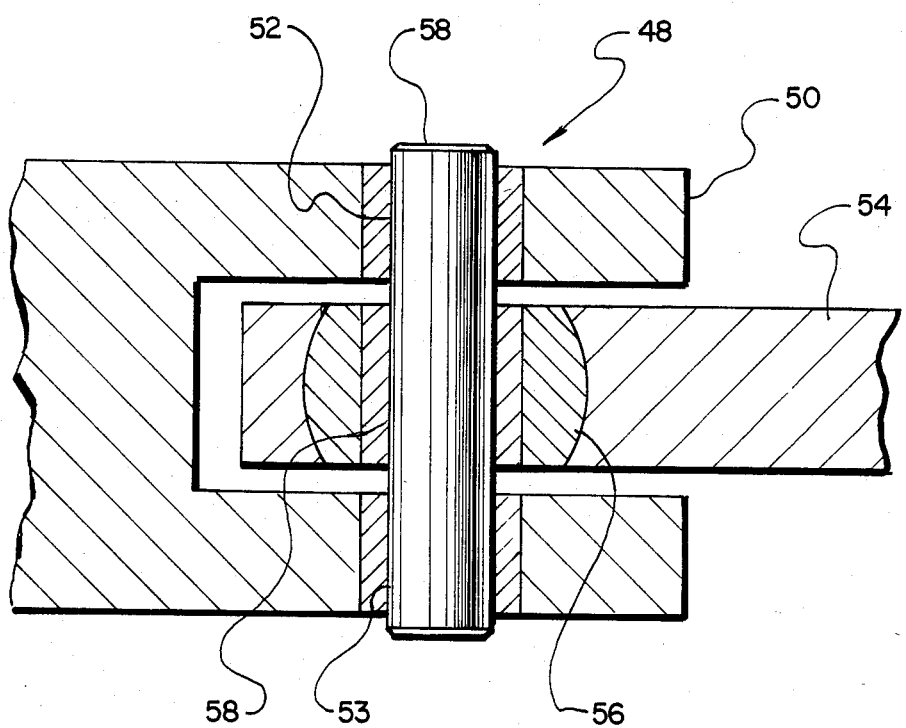
FIG. 4 is an enlarged isometric view of a typical clevis connection.

Referring now to FIG. 4 therein is depicted a typical clevis connection which comprises a U-shaped member 50 which includes two spaced-apart projections, each having a hole 52 and 53 in alignment with each other. Connection 48 further includes a clevis rod 54 confining at its terminal end (in accordance with a particularly preferred embodiment) a spherical rotatable ball member 56 which also is provided with a hole 58 therethrough. Clevis rod 54 and ball member 56 are interconnected to trunnion member 50 by a clevis pin 58. As is clearly seen, clevis rod 54 is readily pivotal about pin 58. In addition, the clearance between the interconnecting parts may be selected such to accommodate some transverse movement. It will be readily appreciated by those skilled in the art that trunnion member 50 may be a separate part which is in turn connected to the various bearing plates and steam generator assembly or alternatively it may be formed as an integral portion of the part to which it is to be connected.

Initially, the steam generator and support system will be installed such that elongated rod members 28 which provide horizontal support are initially substantially horizontal and those providing support for the weight of the steam generator assembly 12 are substantially vertical. In operation as a result of thermal transients, upper portion 14 of steam generator assembly 12 will expand linearly along the Y axis as much as 10 inches between support assembly 20 and support assembly 22. This expansion is readily accomodated by the pivotal motion of the horizontal support assemblies. In addition, some torsional distortion of steam generator assembly 12 may occur (rotation about the Y axis). Upper horizontal support assembly 20 accommodates this rotational distortion by pivotal movement of balance beam 20 thereby minimizing any bending moments being transferred from the support to the support structure. In a similar manner, lower support assembly 18 allows bending of the steam generator about the X axis as a result of thermal distorsion or seismic loading via pivotally mounted balance beam 30. Thus the present invention overcomes many of the problems encountered when a J-shaped steam generator is mounted in an inverted position by a support system which encompasses its periphery at a single plane or horizontal level. Specifically it has been found that the support system of the present invention minimizes thermal fatigue and transient problems resulting from thermal stress. In addition, the transfer of stress and forces resulting from a seismic disturbance between the steam generator assembly and the support structure are substantially reduced.

Various modifications may be made to the steam generator support system without departing from the true spirit and scope of the invention. For example, while the invention has been described with respect to specific clevis connections and pivotal balance beams, other types of connections and force transfer methods could be utilized. Therefore, the foregoing specification should be considered as illustrative rather than limiting.

What is claimed and desired to be secured by Letters Patent of the United States is:

1. A support system for connection to an outer surface of a J-shaped steam generator, said steam generator being located within a support structure, and said system providing support in a vertical Y axis direction and horizontal X and Z axes directions, each of said axes being perpendicular to the others, said system comprising;

a vertical support means located intermediate a lower bent portion forming the J-shape of said J-shaped steam generator and said support structure for providing vertical support along said Y axis and providing pivotal motion in a selected one of said X and Y axes to prevent bending moments from being transmitted between said steam geneator and said support structure, said vertical support means including a pair of spaced apart, vertically extending elongated rod members pivotally connected to opposite sides of said steam generator;

a first pair of horizontal support means, one located adjacent the lower bent portion of said steam generator and the other adjacent an upper portion of said steam generator for providing lateral support in a selected one of said X or Z axes, each of said support means permitting movement along said vertical Y axis and resisting any movement along the selected horizontal axis, one of said pair of support means permitting rotational movement of said steam generator about said Y axis and the other of said support means resisting such rotational movement whereby the transfer of bending moments through said first pair of support means as a result of any rotational movement of said steam generator or said support structure is substantially minimized and;

a second pair of horizontal support means for providing horizontal support in the other of said X or Z axes, each of said second pair of support means permitting vertical movement of said steam generator along said Y axis and resisting any horizontal movement of said steam generator.

2. The support system of claim 1 wherein said first pair of horizontal support means is located opposite the bent portion of the steam generator and each of said pair includes a pair of horizontally extending rod members and means for pivotally connecting said rod members to opposite sides of the steam generator.

3. The support system of claim 1 wherein each of said support means includes at least one elongated rod member terminating at each end in a clevis connection.

4. The support system of claim 3 wherein said first pair of horizontal support means is located opposite the bent portion of the steam generator and each of said pair includes a pair of horizontally extending rod members and means for pivotally connecting said rod members to opposite sides of the steam generator.

* * * * *

UNITED STATES PATENT AND TRADEMARK OFFICE
CERTIFICATE OF CORRECTION

PATENT NO. : 4,688,628
DATED : August 25, 1987
INVENTOR(S) : James E. Moldenhauer It is certified that error appears in the above-identified patent and that said Letters Patent is hereby corrected as shown below:

Column 5, Claim 1, line 23 after "and" delete "Y" and insert --Z--.

Signed and Sealed this

Nineteenth Day of January, 1988

Attest:

DONALD J. QUIGG

Attesting Officer

Commissioner of Patents and Trademarks